United States Patent
Craig et al.

(10) Patent No.: US 11,989,465 B2
(45) Date of Patent: May 21, 2024

(54) SYSTEM AND METHOD FOR IMPROVED PRINT RENDERING USING METALLIC OBJECT DETECTION TECHNIQUES ON INPUT IMAGES

(71) Applicant: Xerox Corporation, Norwalk, CT (US)

(72) Inventors: David C. Craig, Pittsford, NY (US); Eliud Robles Flores, Webster, NY (US); Lee C. Moore, Penfield, NY (US); Paul Roberts Conlon, New York, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/306,077

(22) Filed: May 3, 2021

(65) Prior Publication Data

US 2022/0350548 A1    Nov. 3, 2022

(51) Int. Cl.
*G06F 3/12* (2006.01)
*G06V 30/40* (2022.01)

(52) U.S. Cl.
CPC .......... *G06F 3/1208* (2013.01); *G06F 3/1256* (2013.01); *G06V 30/40* (2022.01)

(58) Field of Classification Search
CPC ...... G06F 3/1208; G06F 3/1256; G06V 30/40
See application file for complete search history.

(56) References Cited

U.S. PATENT DOCUMENTS

| | | | |
|---|---|---|---|
| 2001/0049748 A1* | 12/2001 | Terada | H04L 12/2874 709/225 |
| 2009/0244118 A1* | 10/2009 | Kakutani | B41J 2/2107 347/6 |
| 2015/0220566 A1* | 8/2015 | Cumming | G06F 16/35 707/711 |
| 2019/0050368 A1* | 2/2019 | Chen | G06N 7/005 |
| 2019/0065907 A1* | 2/2019 | Strong | G06N 3/0454 |
| 2019/0102646 A1* | 4/2019 | Redmon | G06V 20/52 |
| 2019/0180094 A1* | 6/2019 | Zagaynov | G06V 30/413 |
| 2020/0111447 A1* | 4/2020 | Yaacob | G06N 5/01 |
| 2020/0125877 A1* | 4/2020 | Phan | G06V 10/763 |
| 2020/0172749 A1* | 6/2020 | Yamaguchi | G06F 3/1205 |

* cited by examiner

*Primary Examiner* — Akwasi M Sarpong
*Assistant Examiner* — Michael L Burleson
(74) *Attorney, Agent, or Firm* — Lippes Mathias LLP

(57) ABSTRACT

A system and method are provided wherein, in at least one form, artificial intelligence is used to identify objects in a document to be considered for metallic rendering or printing on a substrate. Then, the options for printing, including the considerations for rendering in metallic toner or ink, are, in at least one form, presented to the user for acceptance or rejection before the actual printing is initiated.

14 Claims, 3 Drawing Sheets

SYSTEM AND METHOD FOR IMPROVED PRINT RENDERING USING METALLIC OBJECT DETECTION TECHNIQUES ON INPUT IMAGES

BACKGROUND

Printers with the capability to print using metallic toners or inks are becoming increasingly more common. Indeed, at present, there are several printing systems available on the market with metallic printing or rendering options. And it is expected that printer manufacturers will continue to offer current and additional products with metallic printing or rendering options.

One of the challenges in this area is that typical customers do not know how to implement metallic toners or inks most effectively when rendering on, for example, paper. In this regard, customers typically must decide which objects should be rendered as metallic. Unfortunately, customers do not always have a sufficient base of knowledge to make such decisions in an effective manner to produce the most options for improved rendered prints. For example, in many situations, objects may be rendered with silver or gold metallic. Clearly, a gold ring or a silver necklace would be suitable candidates for such metallic rendering. However, there are many other objects that have a metallic luster (e.g., train or subway cars) which might likewise benefit from metallic rendering.

Overall, these challenges result in less use of metallic toners or inks. Customers are thus not afforded the most opportunities for improved rendering. Also, metallic toners or inks are typically sold at premium prices. As such, less use of such toners or inks constitutes missed opportunities for printer manufacturers and toner or ink producers.

BRIEF DESCRIPTION

In accordance with one aspect of the presently described embodiments, a system for printing images of a document on a substrate comprises a processor configured to detect metallic objects represented in the images of the document using an object detection routine trained on metallic objects and to render the detected metallic objects with a metallic toner or ink, an interface configured to display the rendered image to a user and present the user with a plurality of options including 1) print the document using the rendered image with metallic toner or ink, 2) edit the rendered image and then print according to the editing, or 3) reject the rendered image with metallic toner or ink and print the document with non-metallic toner or ink, and an output unit configured to print the document according to a selected option of the plurality of options.

In accordance with another aspect of the presently described embodiments, the object detection routine is an artificial intelligence-based routine.

In accordance with another aspect of the presently described embodiments, the object detection routine is configured to utilize datasets accessed from an external source.

In accordance with another aspect of the presently described embodiments, the interface is configured to display boundary boxes identifying detected metallic objects in the rendered image.

In accordance with another aspect of the presently described embodiments, the interface is configured to display a classification label for detected metallic objects in the rendered image.

In accordance with another aspect of the presently described embodiments, the interface is configured to display a confidence level for detected metallic objects in the rendered image.

In accordance with another aspect of the presently described embodiments, a method for printing images of a document on a substrate comprises receiving an input document including images, detecting metallic objects represented in the images of the document using an object detection routine trained on metallic objects, rendering the detected metallic objects with a metallic toner or ink to obtain a rendered image with metallic toner or ink, displaying the rendered image with metallic toner or ink to a user, presenting the user with a plurality of options including 1) print the document using the rendered image with metallic toner or ink, 2) edit the rendered image and then print according to the editing, or 3) reject the rendered image with metallic toner or ink and print the document with non-metallic toner or ink, and printing the document according to a selected option of the plurality of options.

In accordance with another aspect of the presently described embodiments, the object detection routine is an artificial intelligence-based routine.

In accordance with another aspect of the presently described embodiments, the object detection routine is configured to utilize datasets accessed from an external source.

In accordance with another aspect of the presently described embodiments, the displaying of the rendered image includes displaying boundary boxes identifying detected metallic objects in the rendered image.

In accordance with another aspect of the presently described embodiments, the displaying of the rendered image includes displaying a classification label for detected metallic objects in the rendered image.

In accordance with another aspect of the presently described embodiments, the displaying of the rendered image includes displaying a confidence level for a detected metallic object in the rendered image.

In accordance with another aspect of the presently described embodiments, a system for printing images of a document on a substrate comprises a processor and memory system configured to detect metallic objects represented in the images of the document using an object detection routine trained on metallic objects and to render the detected metallic objects with a metallic toner or ink, and, an output unit configured to print the document including printing the detected metallic objects with the metallic toner or ink.

In accordance with another aspect of the presently described embodiments, a method for printing images of a document on a substrate comprises receiving an input document including images, detecting metallic objects represented in the images of the document using an object detection routine trained on metallic objects, rendering the detected metallic objects with a metallic toner or ink to obtain a rendered image with metallic toner or ink, and, printing the document according to the rendering.

DETAILED DESCRIPTION

According to the presently described embodiments, in at least one form, a trained object detection routine such as an artificial intelligence routine is used to identify objects in a document to be considered for metallic rendering or printing on a substrate, e.g., paper. In at least one form, the options for printing, including the considerations for rendering in metallic toner or ink, are presented to the user for acceptance, modification, or rejection before the actual printing is initiated.

More specifically, according to the presently described embodiments, in at least one form, artificial intelligence algorithms are trained to identify various objects. For example, there are known algorithms that can identify many objects, e.g., Microsoft Azure tool is trained to identify over 10,000 objects. In at least one form, according to the presently described embodiments, the algorithm or routine implemented in the system would be extensively trained on more specifically identifying metallic objects.

Using such an algorithm or routine, the rendering engine on the printer, e.g., a digital front-end (DFE) or controller, analyzes a document to be printed, identifies metallic objects, digitally renders them in either metallic silver or gold color (or other appropriate color), and then displays the rendering to the printer user. In one form, the user would then have the option to accept the metallic rendering, modify it, or simply use standard print colors or non-metallic toner or ink, e.g., CMYK (cyan, magenta, yellow, black), for printing on a substrate, e.g., paper.

Figure 1:
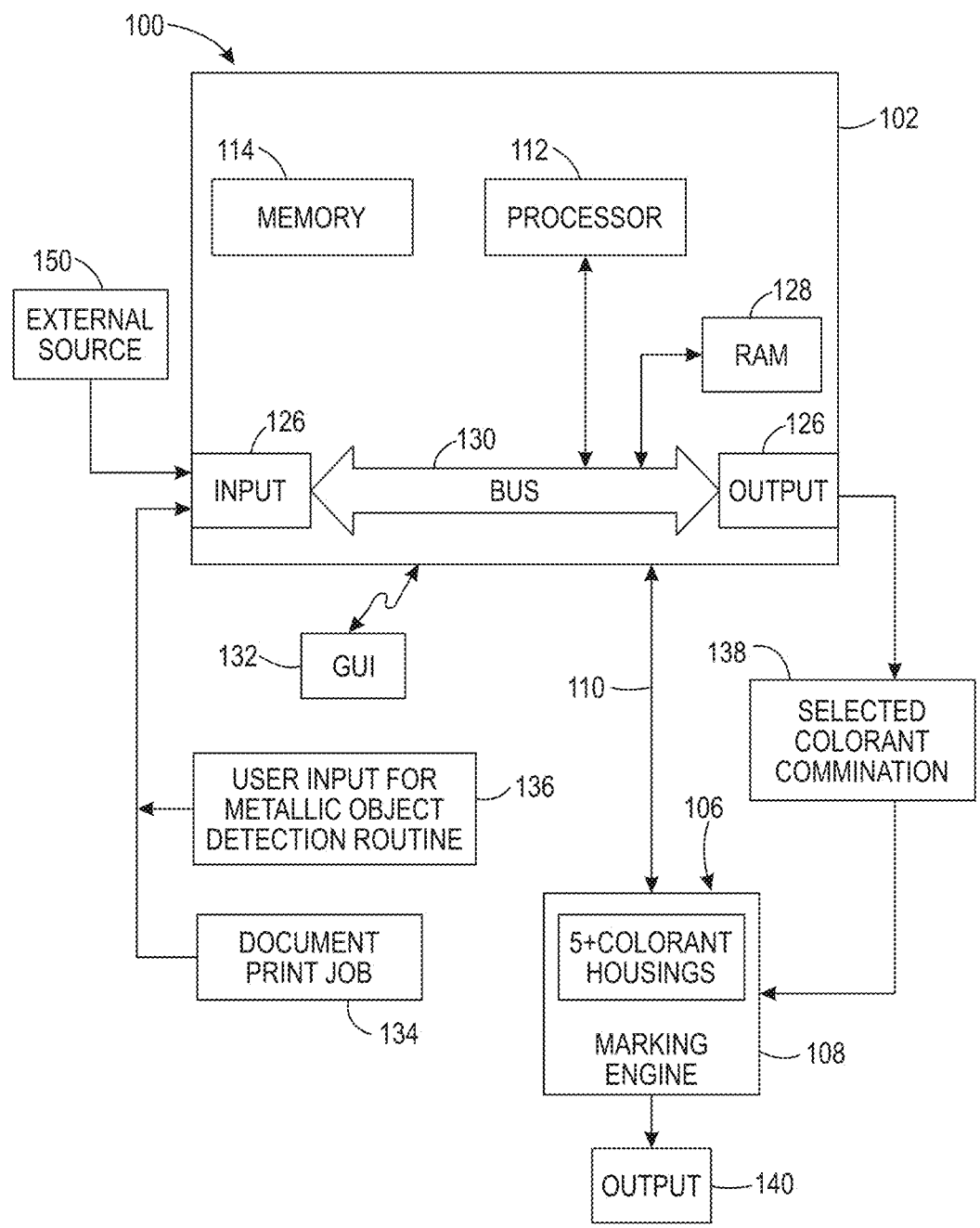
FIG. 1 is an example system according to the presently described embodiments.

More specifically, with reference now to FIG. 1, a schematic illustration is shown of an example system 100 for usage in a five-colorant capable printer, capable of implementing the presently described embodiments. Although a five-colorant capable system is shown, it should also be understood that the presently described embodiments may be implemented in an N-colorant (e.g., 6-colorants) system with at least one of the colorants being metallic.

As shown, the printing system 100 may include a controller 102, such as a digital front end ("DFE") or controller, and an image forming apparatus or printer device 106, including a marking engine or similar rendering device 108, which are linked together by communication links 110 (which may be wired or wireless links), referred to herein as a network. These components are described in greater detail below.

The DFE or controller 102 illustrated in FIG. 1 includes a processor 112, which controls the overall operation of the system by execution of processing instructions or software, which are stored in memory 114 connected to the processor 112.

In general, the system 100 operates based on the input of a document, or print job, 134 to, for example, interface or input 126 and instructions provided in or to the system 100 for rendering the document. This system is also configured to optionally consider a user-selection 136 received (in some examples through GUI 132) for applying a metallic object detection routine according to the presently described embodiments, and ultimately provide a selected colorant combination 138 (which may include a metallic colorant) to the printer device 106 for rendering the output 140.

The DFE or controller 102 includes one or more communication interfaces (I/O), such as network interfaces 126 for communicating with external devices, such as printer device 106 and any external systems or sources 150 such as those including datasets (e.g., artificial intelligence datasets) and other resources (e.g., software routines, processors and/or memories) that may be used by the system 100 to implement the presently described embodiments. The various hardware components such as processor 112, memory 114, and another memory, such as a random-access memory (RAM), 128 may all be connected by a bus 130.

With continued reference to FIG. 1, the DFE or controller 102 is communicatively linked to a user interface device such as a graphical user interface (GUI) 132 via a wired and/or wireless link. In various embodiments, the user interface device 132 may include one or more of a display device, for displaying information to users, and a user input device, such as a keyboard or touch or writable screen, for inputting instructions and/or receiving status information, and/or a cursor control device, such as a mouse, trackball, or the like, for communicating user input information and command selections to the processor 112. Specifically, the user interface device 132 includes at least one of an input device and an output device, both of which include hardware, and which are communicatively linked with the DFE or controller 102 via wired and/or wireless link(s).

As mentioned, the DFE or controller 102 is communicatively linked with the printer 106 via link 110. The exemplary printers 106 may each include the marking engine 108, which applies marking medium, such as ink or toner or ink, to a substrate, such as paper, using, for example, a xerographic, electrostatic, laser, thermal, or other transfer process using, for example, photoreceptors, charging devices, developers, fusers, and/or other mechanisms or techniques known in the printing field. Inkjet processes may also be implemented. The printer 106 renders images on print media, such as paper, and can be a copier, laser printer, bookmaking machine, facsimile machine, or a multifunction machine (which includes one or more functions such as scanning, printing, archiving, emailing, and faxing).

The memory 114 and memory 128 may represent any type of tangible non-transitory computer readable medium such as random-access memory (RAM), read only memory (ROM), magnetic disk or tape, optical disk, flash memory, or holographic memory. In one embodiment, the memory 114 and memory 128 may each comprise a combination of random-access memory and read only memory. The digital processor 112 can be variously embodied, such as by a single-core processor, a dual-core processor (or more generally by a multiple-core processor), a digital processor and cooperating math coprocessor, a digital controller, or the like. The digital processors 112 in addition to controlling the operation of the DFE or controller 102, executes instructions stored in the memory 114 for performing the parts of the method outlined below.

Software modules that may be stored in, for example, memory 114 and/or memory 128, are intended to encompass any collection or set of instructions executable by the system 100 so as to configure the system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 126 may include, for example, a modem, a router, a cable, and/or Ethernet port, etc.

As will be appreciated, while the DFE or controller 102 and printer 106 are illustrated by way of example, the system 100 may be hosted by fewer or more linked computing devices. Each computing device may include, for example, a server computer, desktop, laptop, or tablet computer, smart phone device or any other computing device capable of implementing the method described herein.

As mentioned, the DFE or controller 102 selects a colorant combination 138 for rendering each object in the print job. "Object" may refer to a partial segment in a full, multi-color image, a full (single-color) image on a page, a page/sheet (e.g., in a single color), or the entire document upon which the selection is performed. For example, embodiments are contemplated where the selection can be performed on a page or document basis. Each "object" is associated with a desired color included in or added into the job data, which is provided with the print instruction. Of course, as noted herein, according to the presently described embodiments, in at least one form, at least one of the colorants may be metallic colorant used to print selected and identified metallic objects using metallic toner or ink, as may be determined and/or selected by a user.

It should be appreciated that, in at least one implementation of the presently described embodiments, the system 100 utilizes the DFE or controller 102 to perform image processing on the input image. The image processing includes, for example, addressing conversion of input RGB (red, green, blue) data to, for example, CMYK data for rendering. Such image processing will, in at least one form, also include a fifth plane or colorant, in addition to the CMYK data. This additional plane or colorant may be a metallic plane or colorant.

Thus, in accord with the presently described embodiments, object identification (based on training of a suitable object identification algorithm, routine, or technique) is applied to the image by the DFE or controller 102 to identify metallic objects in the image. In this regard, several datasets have been released for object detection challenges. Researchers publish results of their algorithms applied to these challenges. For example, a well-known dataset for object detection has a training dataset that is composed of around 500,000 images only for training and 200 categories. According to the presently described embodiments, training would be focused on identifying metallic objects. In at least one form, the algorithm is highly successful in identifying metallic objects as well as their color, e.g., silver and gold. It should also be appreciated that the training of the system could be accomplished at a variety of different points in the system manufacturing, set-up, and implementation processes. In one form, the training of the system is accomplished during the manufacturing stage. Such training may also be updated by the user of the system at various appropriate points during the life of the printing system. Further, for some users, objects may be added to the training. For example, uncommon objects/images such as metallic logos or other objects/images of choice may be added so that they are recognized during the object detection routine. And, user selections and/or modifications (such as those input, for example, through use of the interface or GUI 132) during implementation of the presently described embodiments may also be fed back to the system to update the datasets being used.

According to the presently described embodiments, in one form, the DFE or controller 102 stores, maintains and executes the metallic object detection routine as well as stores and maintains the appropriate datasets used by the metallic object detection routine. In one form, the datasets are built (e.g., training is accomplished) before the manufacturing and/or set-up of the system and stored and maintained on the system. In this way, for example, the experience and expertise of the manufacturer of the system can be advantageously utilized to train the system to identify metallic objects. In one example of this form of the presently described embodiments, an external source (such as external source 150) may not be accessed or, in some forms, may not be necessary.

In another form, the trained datasets can be accessed from an external source that has created, for example, trained or artificial intelligence-based datasets to identify metallic objects. These datasets are then stored on the system, e.g. the DFE or controller 102, during the manufacturing process and accessed during the execution by the DFE or controller 102 of the metallic object detection routine.

In another alternative, the external source 150 may be accessed on an as-needed-basis before print jobs where the presently described embodiments will be implemented to access datasets to be used in the execution of the metallic object detection routine. In one form, the datasets, thus, need not be stored on the system but can be maintained and updated at the external source.

In the environment where an external source is utilized, the system 100 or a resource that is used to manufacture or set-up system 100, in one form, would access an external source to retrieve, for example, datasets and other resources that will be useful in the detection of metallic objects according to the presently described embodiments. In practice, in at least one form, the external source could be provided by a third party or provided by the entity providing the printing system. Also, the external source may be implemented in a variety of manners including in a traditional dedicated network/database form or a cloud-based form. For example, cloud-based algorithms or software routines and databases are accessed by the system 100. An advantage of a cloud-based system is that data and resources can be updated (randomly, periodically, or otherwise) and changed to reflect the work of many users who are able to connect from anywhere.

Whether or not cloud-based, the external source 150 may take a variety of forms. For example, it may be in one location or distributed. As a further example, the external source 150 may comprise multiple external sources for supply of datasets. One external source may be a global or universal source open to receive results from any source in any location. This will likely lead to a statistically enhanced dataset benefitting from global or universal knowledge to improve the contemplated metallic object detection according to the presently described embodiments. Another external source may only allow for collection of results for a geographic region, thus gaining the benefits of local influence and improving the detection for objects that may be unique or more common to specific geographic regions.

Another variant of the external source may be that it may be a dedicated external source, that is, dedicated for use only for a specific purpose or product line. While not as inclusive as using varying sources of challenges and challenge results or training, for example, a dedicated external source may nonetheless be advantageously implemented where sufficient datasets can be grown and/or maintained by, for example, a single manufacturer.

It should also be appreciated that, in at least one form, the system would supplement or enhance its access to an external source through use of a dedicated internal source for datasets and other resources that may be stored, maintained, and run using the memory and processor structure of the system 100.

In another alternative, at least the metallic object detection routine and datasets may be stored on the external source (e.g., an external cloud environment). In this form, the DFE or controller 102, or other control features of the system, would transmit an image to the external source and the metallic object detection routine would be executed on the image. The results would be sent back for necessary processing and printing using the system.

According to the presently described embodiments, during detection, the presence of objects is located within a bounding box and types or classes of the located objects in an image are determined. In this regard, the input is an image with one or more objects, such as a photograph. The output may take a variety of forms but, in at least one form, the output is one or more bounding boxes (e.g., defined by a point, width, and height), and a class label for each bounding box. As will be discussed below, in at least one form, the bounding boxes and confidence levels may also be presented to the user. Also, according to the presently described embodiments, in at least one form, a dictionary is used to categorize objects as metallic. For example, a subway train, silverware, gold ring, would be classified as metallic. The object detection routine will generate code and results that can be used by the system to render the input image and, in at least some forms, present the image to the user, as described below.

Objects identified as metallic in documents are then digitally rendered with, for example, metallic silver or gold. The results are, in at least one form, then displayed to the user using, for example, the GUI 132. In this regard, in at least one form, one or more bounding boxes (e.g., defined by a point, width, and height), and a class label for each bounding box may be used to identify to the user the detected metallic objects. Also, in at least one form, the user is presented with the options to (1) accept the rendering and print, (2) modify or edit the rendering then print, or (3) simply print with, for example, a non-metallic toner or ink, such as CMYK material. The user then may select an option and the system outputs or prints the image accordingly.

It should be appreciated that display to the user may not be implemented in some embodiments. Also, display to the user may be implemented as an option that can be selectively turned on and off at the discretion of the user.

Figure 2:
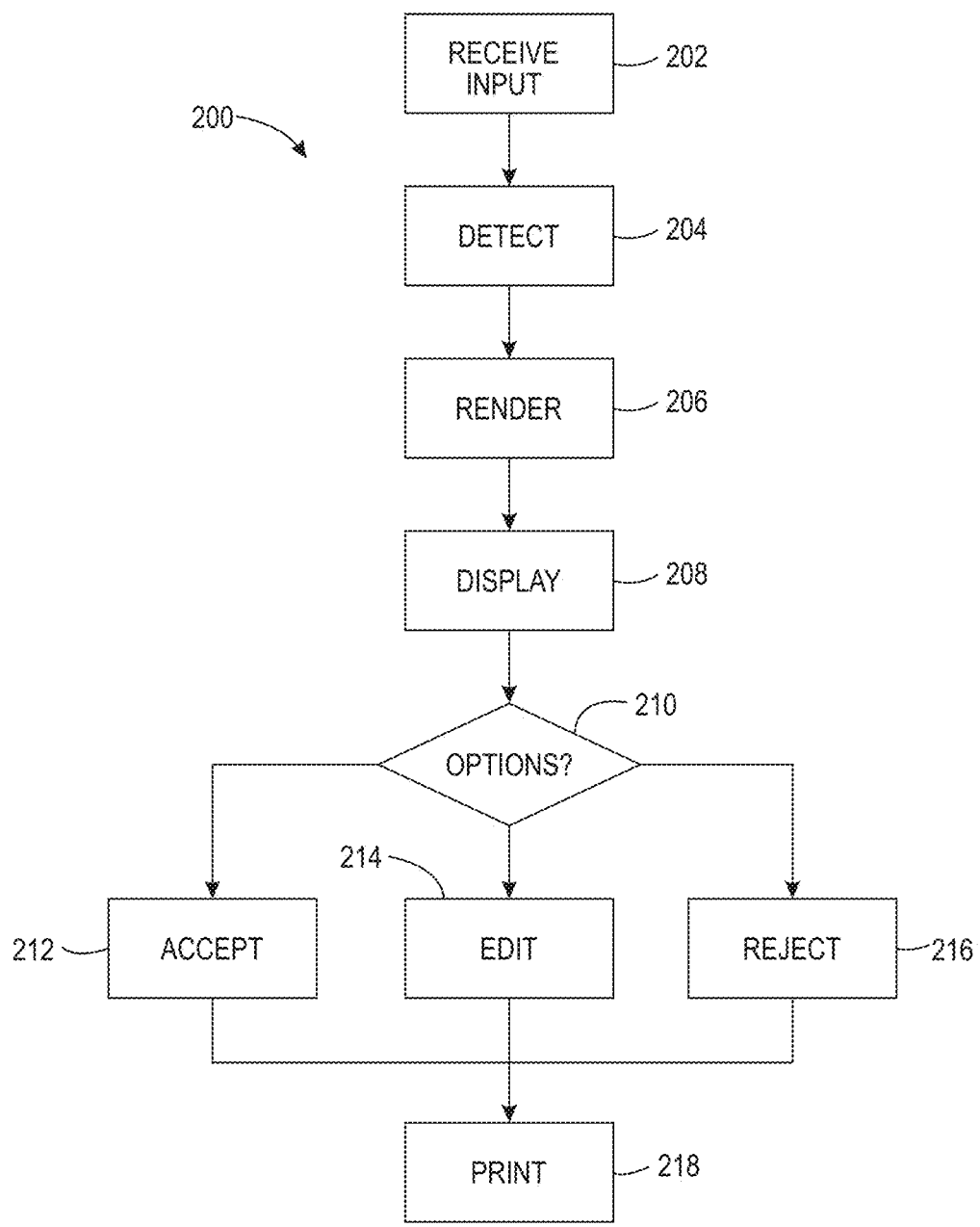
FIG. 2 is an example method according to the presently described embodiments.

Now, with reference to FIG. 2, an example method according to the presently described embodiments is shown. It should be appreciated that this method and others according to the presently described embodiments may be implemented in a variety of manners. For example, the system of FIG. 1 may be used to implement these methods using, as described and in other manners, alone or in combination, hardware configurations and/or software routines having instructions stored on non-transitory computer readable media and run by suitable processors. Other system environments may also be used to implement the method(s) of the presently described embodiments.

In FIG. 2, an example method 200 is shown for printing images of a document on a substrate includes receiving an input document including images (at 202). Metallic objects represented in the images of the document are detected using an object detection routine trained on metallic objects according to the presently described embodiments (at 204). In one form, the metallic object detection routine is triggered by a user selection, as optionally shown in FIG. 1. The detected metallic objects are rendered with a metallic toner or ink to obtain a rendered image with or including metallic toner or ink (at 204). Then, the rendered image with metallic toner or ink is displayed to a user (at 208).

Figure 3:
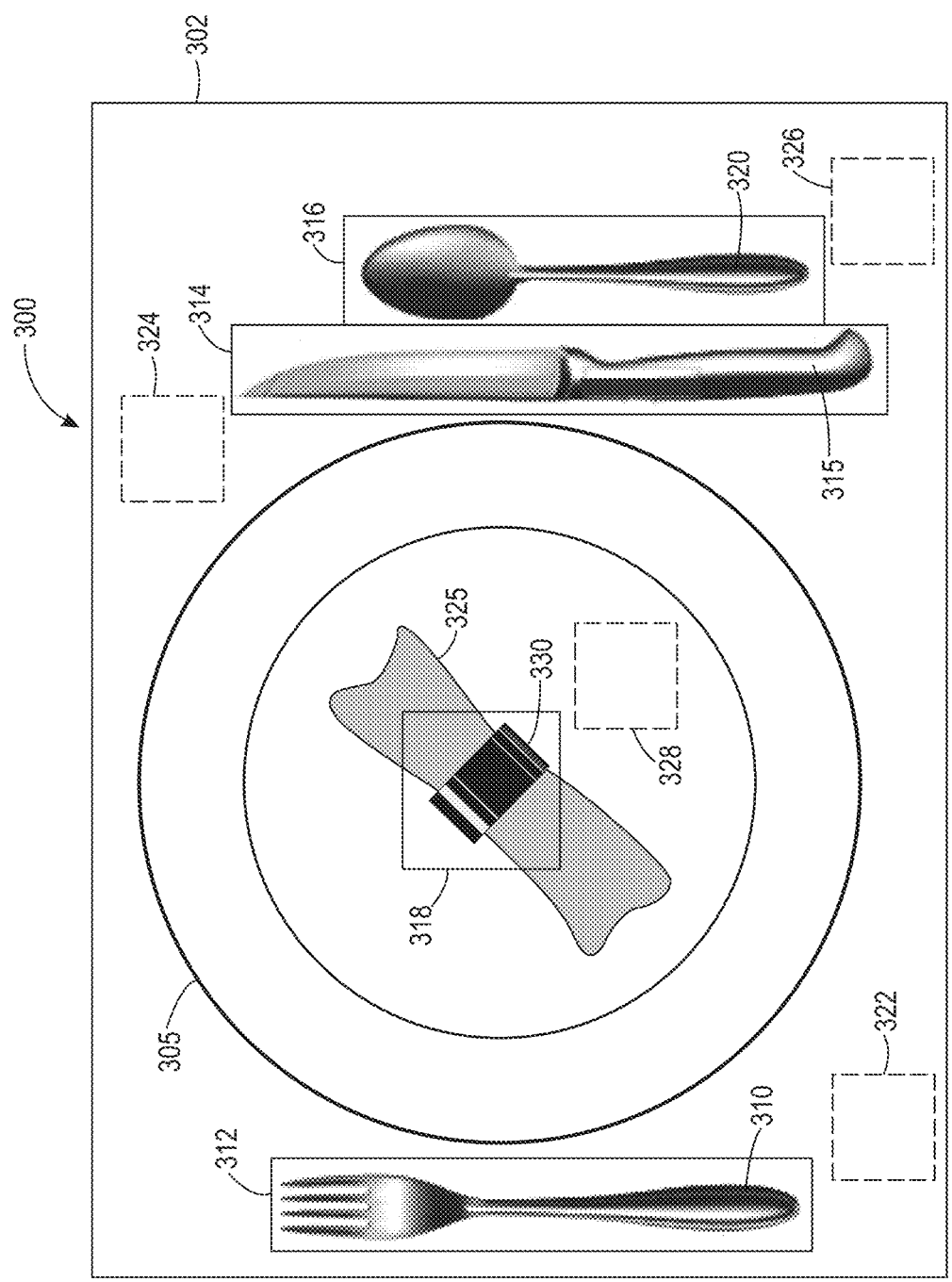
FIG. 3 is a representative illustration of an interface presented to a user according to the presently described embodiments.

With reference to FIG. 3, an interface 300 which may be presented to a user on, for example, the GUI 132 of FIG. 1, showing a place setting on a table 302 is illustrated. For ease of illustration, FIG. 3 is primarily a line drawing; however, it should be appreciated that the actual interface 300 would include, for example, computer-generated graphics overlying a digital image or photograph rendered in color. As shown, the image of the table 302 includes a plate 305, fork 310, knife 315, spoon 320, napkin 325, and napkin ring 330. The metallic objects 310, 315, 320, and 330 are also surrounded by bounding boxes 312, 314, 316, and 318, respectively. In some embodiments, the interface may also provide for bounding boxes with labels corresponding to the detected object and, in some forms, a confidence level for the detection. For example, bounding box 312 may also include a label: fork (0.8)—representing an 80% confidence level that the object detection routine detected a fork. Also shown are elements 322, 324, 326, and 328 which represent pop-up or drop-down boxes to convey information to the user and/or accept input from the user. For example, the element 322 may include the aforementioned object label and confidence level, fork (0.8).

With reference back to FIG. 2, the user is also presented with a plurality of options (at 210) including 1) accept and print the document using the rendered image with metallic toner or ink (at 212), 2) edit the rendered image and then print according to the editing (at 214), or 3) reject the rendered image with metallic toner or ink and print the document with, for example, non-metallic toner or ink, such as CMYK material (at 216). In this regard, these options could be presented to the user, for example, in at least one of the pop-up or drop-down box elements 322, 324, 326, and 328 or in other elements or manners so the user is able to accept, reject or edit (or modify) individual or groups of objects, the image as a whole and/or both. In this example way, the user gains the benefit of the improved detection process and granularity in the ink selection process to print the image in a desired manner. After the user selects an option from the plurality of options, the document is printed according to the selected option (at 218).

As noted above, the display to the user and, thus, user interaction, may be limited or eliminated in some embodiments. As noted, for example, such display to the user may be selectively initiated at the discretion of the user.

An advantage of the presently described embodiments is that an automated process, based in at least one form on artificial intelligence, is used for identifying objects in a job that have been classified as metallic. This allows for presentation to the user of a rendering of the document using metallic toners or inks before the rendering is completed using a printing process. This will result in more use of metallic toners or inks, which are generally sold at a premium compared to other inks.

As alluded to above, the current, alternative, approach is for document designers to tag certain objects as metallic, but this often results in many missed opportunities as designers tend to focus on the obvious, e.g., gold rings, silver bracelets. A typical document designer lacks sufficient knowledge, expertise, and skill in the intricacies of document rendering to be able to manually achieve the results that can be achieved using trained routines, e.g., artificial intelligence-based detection routines. As a result, many objects such as, for example, subway trains, and a large variety of other metallic objects, would simply be overlooked by the human eye of the document designer. In addition, the overall speed of a manual system would be much less than the speed of a system using artificial intelligence-based detection routines.

Another alternative could be to use color recognition, e.g., identify gold-colored areas of the image to be considered for rendering in metallic gold color toner or ink. However, this technique also has problems since, for example, all gold or silver features in an image are not necessarily suitable for printing with metallic toner or ink. As but one example, one would typically not wish to render a "golden sunset" with metallic gold color toner or ink. According to the presently described embodiments, it is ultimately more effective to identify objects, determine whether the object is an object that has been classified as metallic, and then render appropriately.

Also, a feedback system based on user feedback only, when compared to a system using trained or artificial intelligence-based detection routines and/or datasets, would have drawbacks of less data and, thus, less knowledge upon which to draw for decision-making on whether to print using metallic toner or ink. In systems implementing the presently described embodiments using, for example, artificial intelligence, depending on the openness of the artificial intelligence routine used, the volume of available training data would contribute significantly to better rendering and the overall intelligence and efficiency of the system. As another example, the system in some forms according to the presently described embodiments may communicate through networks, e.g., the internet, with other resources (e.g., such as cloud-based resources) to implement enhancements to the quantity and quality of training data, as well as enhancements to the system functionality.

Furthermore, the automation of the procedure, resulting in the user being presented with a metallic rendering of their documents, presents new ideas to them, and if accepted, results in a higher use of metallic toner or ink.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for printing images of a document on a substrate, the system comprising:
   a processor configured to identify metallic objects represented in the images of the document using a metallic object detection routine utilizing a data set and being trained on metallic objects and to render the detected metallic objects with a metallic toner or ink;
   an interface configured to display the rendered image to a user and present the user with a plurality of options including 1) print the document using the rendered image with metallic toner or ink, 2) edit the rendered image and then print according to the editing, and 3) reject the rendered image with metallic toner or ink and print the document with non-metallic toner or ink; and,
   an output unit configured to print the document according to a selected option of the plurality of options.

2. The system as set forth in claim 1 wherein the metallic object detection routine is an artificial intelligence-based routine.

3. The system as set forth in claim 1 wherein the metallic object detection routine is configured to access the dataset from an external source.

4. The system as set forth in claim 1 wherein the interface is configured to display boundary boxes identifying detected metallic objects in the rendered image.

5. The system as set forth in claim 1 wherein the interface is configured to display a classification label for detected metallic objects in the rendered image.

6. The system as set forth in claim 1 wherein the interface is configured to display a confidence level for detected metallic objects in the rendered image.

7. The system as set forth in claim 1 wherein the dataset is updatable.

8. The system as set forth in claim 1 wherein the dataset is stored and maintained on the system.

9. A method for printing images of a document on a substrate, the method comprising:
   receiving an input document including images;
   identifying metallic objects represented in the images of the document using a metallic object detection routine utilizing a data set and being trained on metallic objects;
   rendering the detected metallic objects with a metallic toner or ink to obtain a rendered image with metallic toner or ink;
   displaying the rendered image with metallic toner or ink to a user;
   presenting the user with a plurality of options including 1) print the document using the rendered image with metallic toner or ink, 2) edit the rendered image and then print according to the editing, and 3) reject the rendered image with metallic toner or ink and print the document with non-metallic toner or ink; and,
   printing the document according to a selected option of the plurality of options.

10. The method as set forth in claim 9 wherein the metallic object detection routine is an artificial intelligence-based routine.

11. The method as set forth in claim 9 wherein the metallic object detection routine is configured to access the dataset from an external source.

12. The method as set forth in claim 9 wherein the displaying of the rendered image includes displaying boundary boxes identifying detected metallic objects in the rendered image.

13. The method as set forth in claim 9 wherein the displaying of the rendered image includes displaying a classification label for detected metallic objects in the rendered image.

14. The method as set forth in claim 9 wherein the displaying of the rendered image includes displaying a confidence level for a detected metallic object in the rendered image.

* * * * *